(12) United States Patent
Tulsyan

(10) Patent No.: US 12,366,184 B1
(45) Date of Patent: Jul. 22, 2025

(54) SYSTEMS AND METHODS FOR DISTRIBUTING FLUID IN A ROTATING CHAMBER

(71) Applicant: Archer Aviation Inc., San Jose, CA (US)

(72) Inventor: Bharat Tulsyan, San Jose, CA (US)

(73) Assignee: ARCHER AVIATION INC., San Jose, CA (US)

( * ) Notice: Subject to any disclaimer, the term of this patent is extended or adjusted under 35 U.S.C. 154(b) by 0 days.

(21) Appl. No.: 18/913,602

(22) Filed: Oct. 11, 2024

(51) Int. Cl.
| | |
|---|---|
| *F01M 1/06* | (2006.01) |
| *B64D 33/08* | (2006.01) |
| *F01D 25/18* | (2006.01) |
| *H02K 5/20* | (2006.01) |
| *H02K 9/19* | (2006.01) |

(52) U.S. Cl.
CPC ............... *F01M 1/06* (2013.01); *H02K 5/203* (2021.01); *H02K 9/19* (2013.01); *B64D 33/08* (2013.01); *F01D 25/18* (2013.01)

(58) Field of Classification Search
CPC ............... F01D 25/18; H02K 2209/00; Y10T 137/2514; Y10T 137/2516; Y10T 137/85938
See application file for complete search history.

(56) References Cited

U.S. PATENT DOCUMENTS

| | | |
|---|---|---|
| 3,767,013 A | 10/1973 | Caldwell |
| 5,042,616 A | 8/1991 | McHugh |
| 5,119,905 A | 6/1992 | Murray |
| 5,293,089 A * | 3/1994 | Frister ............... H02K 5/203 |
| | | 310/64 |
| 5,667,157 A | 9/1997 | Prew |
| 6,355,995 B1 * | 3/2002 | Jeppesen ............ H02K 9/12 |
| | | 310/58 |
| 8,749,102 B2 | 6/2014 | Kozaka et al. |
| 8,784,036 B2 | 7/2014 | Woollenweber |
| 10,557,502 B2 | 2/2020 | Sakazaki et al. |
| 10,808,728 B2 | 10/2020 | Tokuyama |

(Continued)

OTHER PUBLICATIONS

Ramsey, Phil, "Around and Around—Where the Oil Goes in Your Engine", Machinery Lubrication, Sep. 26, 2011, 5 pages, Noria Corporation, www.machinerylubrication.com/Read/532/around-around-where-oil-goes-in-your-engine.

*Primary Examiner* — Robert K Arundale
(74) *Attorney, Agent, or Firm* — Finnegan, Henderson, Farabow, Garrett & Dunner, LLP

(57) ABSTRACT

A fluid distribution system for an engine including a fluid chamber. The fluid distribution system may include a first control opening in fluid communication with the fluid chamber. A rotor coupled to the fluid chamber may be configured to rotate the chamber about the axis to cause the fluid chamber to distribute fluid through the first control opening. A first channel coupled to the first control opening may be configured to receive the fluid through the first control opening. A second control opening may be formed in the first channel. A relief opening in the first channel may be configured to expose the first channel to an ambient pressure outside the first channel. The relief opening may be located downstream of the first control opening in a fluid flow direction of the first channel and upstream of the second control opening in the fluid flow direction of the first channel.

28 Claims, 7 Drawing Sheets

(56) References Cited

U.S. PATENT DOCUMENTS

| | | | |
|---|---|---|---|
| 10,934,888 B2 | 3/2021 | Avis et al. | |
| 11,286,944 B2 | 3/2022 | Fukuyama et al. | |
| 12,027,922 B2 * | 7/2024 | Dang | H02K 21/14 |
| 2011/0280710 A1 * | 11/2011 | Mariotti | F04D 17/14 |
| | | | 415/65 |
| 2013/0038151 A1 * | 2/2013 | Ohashi | H02K 7/086 |
| | | | 310/59 |
| 2014/0070637 A1 | 3/2014 | Hamer et al. | |
| 2017/0012500 A1 * | 1/2017 | Brauer | H02K 1/32 |
| 2019/0207477 A1 | 7/2019 | Garriga et al. | |
| 2022/0056846 A1 * | 2/2022 | Pazinski | F01D 25/12 |
| 2022/0302795 A1 * | 9/2022 | Barden | H02K 5/20 |
| 2024/0116643 A1 * | 4/2024 | Graves | H02K 5/18 |
| 2024/0146154 A1 * | 5/2024 | Vanhee | H02K 9/193 |
| 2024/0253791 A1 * | 8/2024 | Graves | F16H 57/08 |
| 2024/0253797 A1 * | 8/2024 | Tepe | B64C 27/54 |
| 2024/0270394 A1 * | 8/2024 | Graves | H02K 7/08 |

* cited by examiner

SYSTEMS AND METHODS FOR DISTRIBUTING FLUID IN A ROTATING CHAMBER

TECHNICAL FIELD

This disclosure relates generally to the field of engines. More particularly, and without limitation, the present disclosure relates to innovations in pressurized distribution of coolants or lubricants for transmissions and/or motors. Certain aspects of the present disclosure generally relate to improvements in electric propulsion systems that may be used in aircrafts driven by electric motors and in other types of vehicles.

BACKGROUND

Vertical takeoff and landing (VTOL) aircraft, such as helicopters and electric aircraft, typically include one or more propellers configured to propel air downward to provide vertical lift for takeoff, landing and hovering. VTOL aircraft, as well as other vehicles and machines, may comprise rotating systems (such as propeller motors) that must be able to consistently distribute lubricants or coolants (such as oil) to multiple components, and fluid distribution systems may assist in such distribution. However, typical or conventional fluid distribution systems may suffer from a variety of inefficiencies. For example, conventional fluid distribution systems may not be able to distribute sufficient fluid to components located at different distances (e.g., at different radii from an axis of rotating systems), and certain components may be starved of fluid while other components may receive excess fluid. Further, such effects may be exacerbated when a rotating system operates over a range of speeds, as the resulting range of centrifugal forces may cause conventional fluid distribution systems to fail in maintaining desired proportions of fluid distribution or desired flow splits between components.

The systems and methods for distributing fluid disclosed in the present disclosure solve one or more of the problems set forth above and/or other problems of the prior art. For example, some disclosed embodiments include a method of distributing fluid in a rotating machine. Some disclosed embodiments include distributing fluid in the rotating machine discussed above. Some disclosed embodiments include a system including the rotating machine having the fluid distribution system discussed above.

SUMMARY

Some embodiments of the present disclosure fluid distribution system. The fluid distribution system may comprise: a fluid chamber in a rotating machine; a first control opening component in fluid communication with the fluid chamber, the first control opening component being located at a first radial distance from an axis; a rotating shaft coupled to the fluid chamber and configured to rotate the fluid chamber about the axis to cause the fluid chamber to distribute fluid through the first control opening component; a first channel coupled to the first control opening component and configured to receive the fluid through the first control opening component; a second control opening component in the first channel, the second control opening component being located at a second radial distance from the axis, the second radial distance being greater than the first radial distance; and a relief opening in the first channel, the relief opening being configured to expose the first channel to an ambient pressure outside the first channel, wherein the relief opening is located downstream of the first control opening component in a fluid flow direction of the first channel and upstream of the second control opening component in the fluid flow direction of the first channel.

DETAILED DESCRIPTION

The disclosed embodiments provide systems, subsystems, and components for liquid distribution in rotating machines. In some embodiments, the rotating machines may comprise engines, such as electric propulsion systems in VTOL aircraft, or other types of engines.

Reference will now be made in detail to exemplary embodiments, examples of which are illustrated in the accompanying drawings. The following description refers to the accompanying drawings in which the same numbers in different drawings may represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

The disclosed embodiments relate to fluid distribution in rotating spaces, such as can be found in engines, transmissions, motors, generators, turbines, compressors, or other systems. Such systems may rely on the centrifugal forces of their rotating parts to distribute fluids. As an example, a motor may comprise an oil chamber that spins along with the motor's output shaft. The spinning of the chamber may cause oil to be forced radially outward from the chamber and into a network of channels. Each channel may feed oil to one or more components for lubrication such as in, e.g., gears or bearings, or for cooling such as in, e.g., windings or stators. In such systems, it may be desirable to split the flow of fluid among these various channels in specific proportions to meet the needs of each component. This may be done, e.g., by placing control openings in each channel, or at an inlet of the channel, and selecting the control opening sizes so that a desired flow split is achieved. Control openings may comprise components within a channel or at a channel inlet and having, e.g., orifices, narrow channel sections, screens, flow-disrupting structures, or other flow restrictors.

However, the fluid pressure at a control opening, and therefore the flow rate through the control opening, may depend on multiple factors, for example: the rotational speed of the system, and the radial distance of the control opening from the axis of rotation. The farther a control opening is spaced from the axis of rotation, the more its flow rate may vary as a function of rotational speed. The result is that an arrangement that provides proper flow splitting at a specific reference rotational speed may not achieve this same flow splitting for other rotational speeds. At speeds that stray too far from this reference speed, for example, some components may receive too much oil while others receive too little. This issue is illustrated in more detail with respect to the comparative example of FIG. 1 below.

Figure 1:
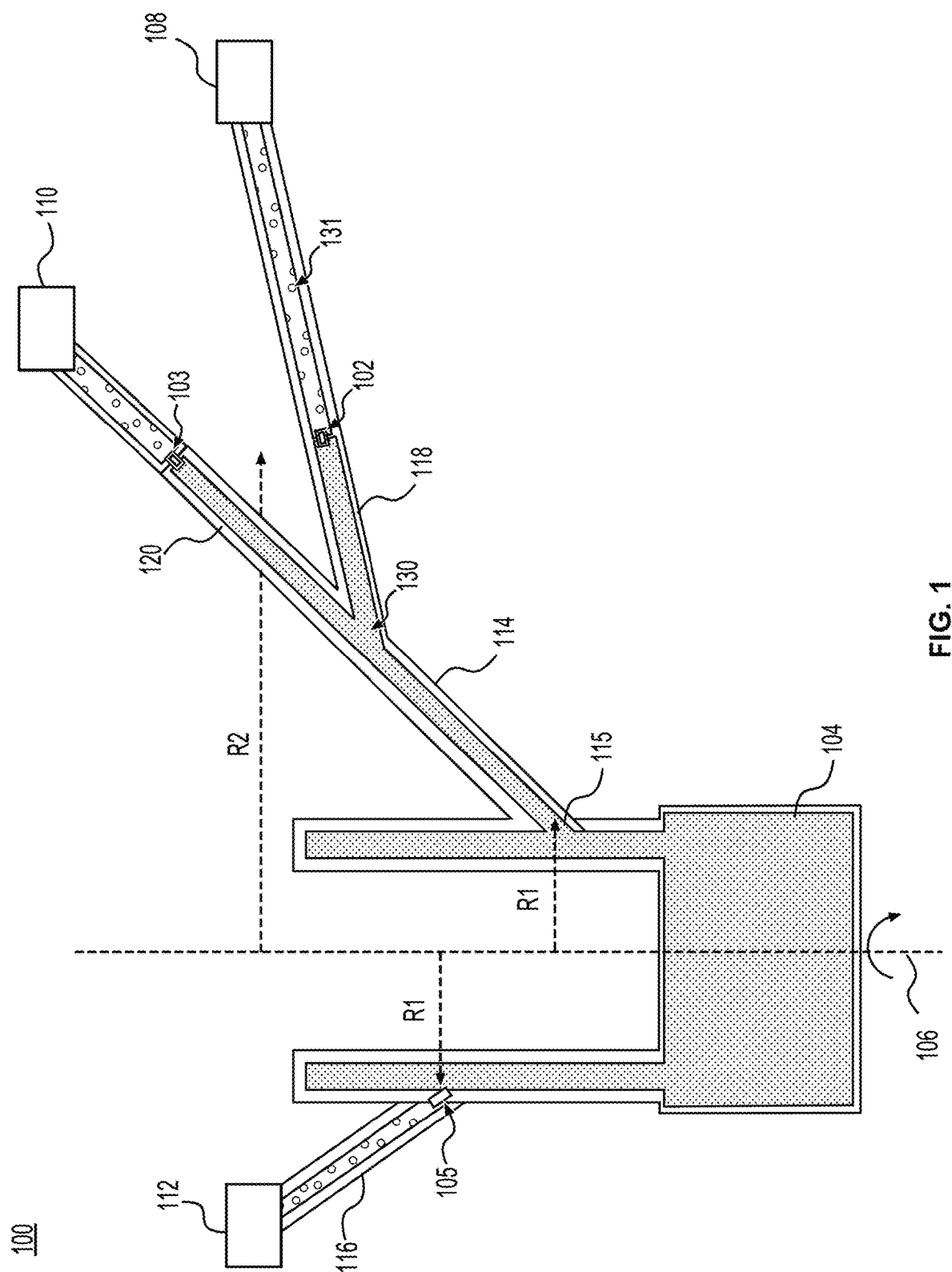
FIG. 1 is a schematic of a fluid distribution system, according to a comparative example.

FIG. 1 illustrates a fluid distribution system 100, according to a comparative example. Fluid distribution system 100 may include a fluid chamber 104 configured to rotate about an axis 106. Axis 106 may refer to a center axis of rotation for fluid distribution system 100. For example, in an electric propulsion system or other engine, fluid chamber 104 may comprise a part of a rotating output shaft which rotates about axis 106, and first and second channels 114 and 116 may be formed within a rotating body that is coupled to the rotating output shaft. Channels refer to compartments for distributing, transporting, spreading, or circulating fluids, including passageways, pipes, tubes, cavities, or conduits. Fluid distribution system 100 may distribute fluids (such as, e.g., oil, glycol, coolants, antifreeze, lubricants, transmission fluids, or the like) to various components via control openings that may be positioned at various radial distances from axis 106. The components may require lubrication (components such as, e.g., bearings or gears) or cooling (components such as, e.g., magnets or windings), which is achieved by distribution of the fluid.

For example, fluid distribution system 100 may distribute fluids to a first component 108 and a second component 110 via channel inlet 115 to first channel 114. First channel 114 may split into a first branch 118 and a second branch 120. Fluid distribution system 100 may also distribute fluids to a third component 112 via second channel 116. First channel 114 and second channel 116 may be in fluid communication (e.g., fluidically coupled) with fluid chamber 104, and fluid may be fed to the channels from the chamber by centrifugal force when the fluid distribution system 100 is rotating. Fluid communication between components may involve the ability for fluids to move, transfer, or flow between or from one component to another, such as when fluid may flow from fluid chamber 104 to first channel 114 and/or second channel 116. In some embodiments, fluid distribution system 100 may include one or more control openings 102, 103, 105. For example, an inner control opening 105 may be located at a first radial distance R1 from axis 106, and outer openings 102 and 103 may be located at a second radial distance R2 that is greater than the first radial distance R1. A control opening may refer to any structure comprising an opening configured to modulate fluid flow. Control openings may include, e.g., orifices, and a control opening may have any shape, such as circular, ovular, rectangular, or slit-shaped, as non-limiting examples. In some embodiments, control openings may comprise, e.g., narrow channel sections, screens, flow-disrupting structures, or other flow restrictors. The size of the control openings can be selected to restrict or otherwise modulate flow (such as, e.g., by altering a flow characteristic from a continuous liquid stream into a spray or film, etc.) in fluid distribution system 100. For example, the shaded regions (such as indicated at 130) on a radially inward (inlet) side of a control opening (such as control opening 102) depict a continuous liquid column whose flow may be restricted into a mixture of liquid and gas on a radially outward (outlet) side of the control opening. The mixture of liquid and gas may be, e.g., a spray, film aerosol, etc., and is depicted in FIG. 1 in the form of droplets 131. Control openings 102, 103 may be disposed in first channel 114 and control opening 105 may be disposed in second channel 116.

The amount of fluid flow passing through a control opening may depend on the liquid pressure head formed when fluid flow is restricted at the inlet side of the control opening. For a rotating liquid column, the liquid pressure head P may be characterized by the formula:

$$P = \frac{1}{2}\rho\omega^2 r^2 \qquad \text{(eqn. 1)}$$

where $\rho$ is the fluid density, $\omega$ is the rotational speed, and r is the radial distance from the axis of rotation. Thus, the amount of fluid flow may change significantly with a change in rotation speed @ as well as with radial distance r. For example, if all control openings 102, 103, and 105 are designed with equal opening sizes, more fluid may be drawn out though each of the radially outer control openings 102 and 103 at the larger second radial distance R2 via channel inlet 115 than through the radially inner control opening 105 at the smaller first radial distance R1. This discrepancy in liquid pressure head between an outer and inner location (such as at the inlet sides of an outer and inner control opening) may be described by a pressure differential $P_d$:

$$P_d = \frac{1}{2}\rho\omega^2(r_{out}^2 - r_{in}^2) \qquad \text{(eqn. 2)}$$

where $r_{out}$ is the radial distance of an outer control opening from the axis of rotation, and $r_{in}$ is the radial distance of an inner control opening from the axis of rotation.

Despite the pressure differential, it may be possible to split fluid to the various components in the desired proportions by selecting appropriate sizes of the control openings 102, 103, 105, at least for one specific reference rotational speed $\omega_1$. For example, in a simple case it may be desirable to divide flow equally to each of components 108, 110, and 112. This may be achieved by designing smaller control openings 102 and 103 and a larger control opening 105 in a way that fluid flows through each opening in a balanced ratio of 1:1:1 despite the higher pressure at second radial distance R2.

However, when the fluid distribution system 100 is rotating at any speed other than the speed @1 for which these opening sizes are optimized, the pressure differential $P_d$ will change according to eqn. 2 above (note that both $\rho$ and $[R2^2-R1^2]$ remain constant, leaving the pressure differential dependent on the square of rotational speed $\omega$). The result is that the flow splitting ratio between two or more control openings at different radial distances will change with $\omega$, which could lead to some components receiving an excess of fluid while others are starved of it. For example, an increase in $\omega$ may cause a larger pressure increase at outer control openings 102 and 103 than at inner control opening 105, causing a relatively larger increase of fluid flow through channel inlet 115 and potentially robbing fluid from control opening 105. Similarly, a decrease in $\omega$ may cause a larger pressure decrease at outer control openings 102 and 103 than at inner control opening 105, which may cause the outer control openings 102 and 103 to receive less fluid than intended while causing inner control opening 105 to receive more.

This imbalance may be of particular concern in engines or other systems that may operate over a range of revolutions per minute (RPM) values, such as, e.g., automobiles, or e VTOL or other distributed propulsion electric aircraft. For example, loss of oil to a component may result in overheating, bearing or gear failure, etc. Such concerns may require an overdesign, such as a larger oil supply and additional systems to divert the excess oil when it is not needed. This may add weight, complexity and expense to a fluid distribution system.

Therefore it may be desirable to achieve consistent flow splitting ratios among various components, regardless of rotational speed. However, the use of actively controllable opening sizes to achieve such consistent flow splitting may require complex, expensive, and failure-prone components and control systems. Accordingly, it may be desirable to design a passive system for achieving such flow splitting. In this context, a passive system may refer to a system that does not require independent control, but operates naturally as a result of its construction and the conditions in its environment, such as static opening sizes and locations, RPM, ambient pressure, etc.

Note that in either case described above, the flow splitting ratio between the two outer control openings 102 and 103 may remain constant because they are located at the same radial distance R2. This results in a pressure differential of 0 due to the radial term of eqn. 2 reducing to $(R2^2-R2^2)=0$. Therefore, any fluid that reaches outer control openings 102 and 103 will be split according to a constant ratio regardless of changes in rotational speed w. As further discussed with respect to FIG. 2 below, embodiments of the present disclosure provide a system that exploits this principle by placing additional control openings at further locations, such as in channel inlet 115, to ensure that fluid is always divided in consistent proportions between control openings at different radial distances.

Figure 2:
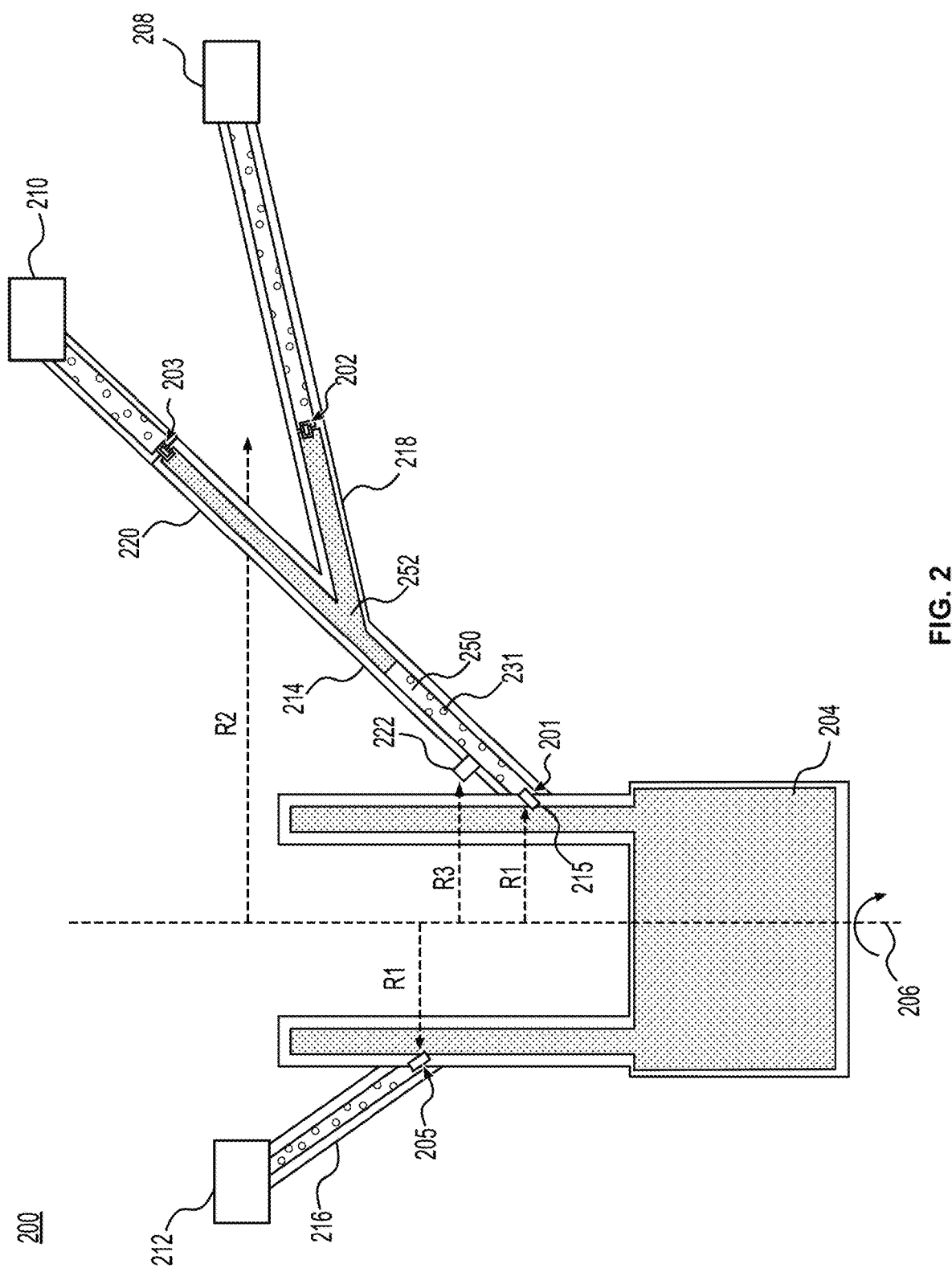
FIG. 2 is a schematic of a fluid distribution system including a relief opening, consistent with disclosed embodiments.

FIG. 2 illustrates a fluid distribution system 200, consistent with embodiments of the present disclosure. In some embodiments, fluid distribution system 200 may be disposed in a propulsion system. For example, fluid distribution system 200 may be disposed in e.g., an engine, transmission, motor, generator, or other similar device, configured to provide mechanical or electrical power to rotate a propeller, wheel axle, or other device of a propulsion system. In some embodiments, fluid distribution system 200 may be disposed in an engine, transmission, motor, or generator that is not part of a propulsion system, or may be disposed in another rotating machine such as, e.g., a turbine, a compressor, or the like. Fluid distribution system 200 may comprise: a first control opening 201; a second control opening 202; a third control opening 203; a fluid chamber 204; a fourth control opening 205; an axis of rotation 206; a first component 208; a second component 210; a third component 212; a first channel 214; a second channel 216; a first branch 218; a second branch 220; and a relief opening 222.

In some embodiments, fluid distribution system 200 may be similar to the comparative example of fluid distribution system 100, except as described below, and similar components may be described with like numerals having a leading digit of "2" instead of "1." For instance, second and third control openings 202 and 203 may be similar to outer control openings 102 and 103. Therefore a detailed description of some elements may be omitted here. Fluid chamber 204 may be configured to rotate about axis 206. Axis 206 may refer to a center axis of rotation for fluid chamber 204. For example, fluid chamber 204 may comprise part of a shaft of an electric propulsion system (such as shaft 311 of electric propulsion system 300 of FIG. 3 discussed below), and axis 206 may be coincide with a longitudinal center axis of the shaft. The shaft may be driven by a rotor to rotate about axis 206. Fluid distribution system 200 may distribute fluids to various components that may be positioned at various radial distances from axis 206. For example, fluid distribution system 200 may distribute fluids from chamber 204 to: first component 208 via first channel 214 and channel inlet 215; second component 210 via first channel 214, and/or a third component 212 via second channel 216. For example, centrifugal force may propel the movement of fluids, such as oil, radially outward into first channel 214 and second channel 216. In some embodiments, channels may include one or more branches. A branch may refer to any offshoot, extension, or projection of a channel, such as an angled extension. For example, first channel 214 may comprise a first branch 218 and a second branch 220 to distribute fluid to first component 208 and second component 210.

In some embodiments, first control opening 201 may be disposed in first channel 214 at a first radial distance R1. As shown in FIG. 2, first control opening 201 may be disposed in, e.g., a channel inlet 215 of first channel 214 at the point where first channel 214 branches off from fluid chamber 204. However, embodiments of the present disclosure are not limited to this. For example, first control opening 201 may be disposed at a further location within first channel 214. The same may be true of fourth opening 205, which may be disposed in a channel inlet of second channel 216 or may be disposed at a further location within second channel 216. However, no matter where in the channels the control openings are disposed, first control opening 201 and fourth control opening 205 may be located at a same first radial distance (such as R1) from axis 206.

Because of their equivalent radial distances, there may be no pressure differential between the inlet side of first control opening 201 and the inlet side of fourth control opening 205, as discussed with respect to eqn. 2 above. Thus it may be possible to choose any desired flow split ratio between them by suitable choice of their respective opening sizes, and the chosen flow split may remain constant even if a rotational speed @ changes. Further, similar to outer control openings 102 and 103 of FIG. 1, second control opening 202 and third control opening 203 may both be located at a second radial distance R2 from axis 206, yielding a zero pressure differential between second control opening 202 and third control opening 203.

Additionally, relief opening 222 may be placed radially outward of first control opening 201. A relief opening may refer to any opening configured to alleviate pressure differences between an internal channel or plenum within fluid distribution system 200 and an external environment. For example, relief opening 222 may be configured to expose first channel 214 to an ambient pressure outside first channel 214. In some embodiments, the ambient pressure may be a local condition of the external environment of fluid distribution system 200. For example, ambient pressure may refer to the pressure inside or outside of an electric propulsion system (e.g., electric propulsion system 300 discussed below). Additionally, or alternatively, ambient pressure may refer to atmospheric pressure. Relief opening 222 may allow gas (such as, air, nitrogen, etc.) to enter or leave first channel 214 to equalize a pressure inside first channel 214 with that of the external environment. In this way a liquid pressure head at second and third control openings 202 and 203 may be decoupled from a liquid pressure head at fourth control opening 205.

For example, in some embodiments, relief opening 222 may be downstream of first control opening 201 and upstream of second control opening 202 and third control opening 203, such as at a third radial distance R3 that is greater than the first radial distance R1 and less than the second radial distance R2. Here, "downstream" and "upstream" may be taken with reference to the flow direction of fluid leading from, e.g., chamber 204 and through a channel (such as first channel 214) as a result of centrifugal forces from rotation about axis 206. As fluid in first channel 214 is exposed to ambient pressure via relief opening 222, the fluid in first channel 214 may be mixed with gas as it is squirted or sprayed downstream (e.g., away from fluid chamber 204). For example, fluid in first channel 214 may include an aerosol portion 250. Aerosol portion 250 may refer to a mixture of gas and liquids, such as liquid droplets 231 suspended in the gas. Aerosol portion 250 may also refer to spray, mist, film, droplets, vapor, or the like. It will be appreciated that second control opening 202 or third control opening 203 may be configured to build a liquid pressure head in first channel 214. For example, second control opening 202 or third control opening 203 may be sized to resist fluid flow such that a liquid column 252 builds in first channel 214 during rotation about axis 206.

As discussed above, compared to the comparative example of FIG. 1, the addition of first control opening 201 and relief opening 222 creates a break in the continuous liquid flow between first radial distance R1 and second radial distance R2, which results in a decoupling of the flow splitting between elements located at the first and second radial distances R1 and R2. For example, even at relatively high rotational speeds, liquid flow through second or third control openings 202 and 203 will not cause liquid to be drawn away from first control opening 201. Instead, flow may be split up in stages at each successive radial distance where flow splitting is needed. For instance, in a simple example embodiment, it may be desirable to divide flow equally to each of components 208, 210, and 212. This may be achieved using a first split among first and fourth control openings 201 and 205 at a ratio of 2:1 respectively, followed by a second split among control openings 202 and 203 at a ratio of 1:1. Regardless of whether a rotational speed of fluid distribution system 200 is increased or decreased, first channel 214 will always receive ⅔ of the total flow, and the second channel 216 will receive ⅓. The flow in first channel 214 may then be divided equally between second and third control openings 202 and 203, such that each of the components 208, 210, and 212 receives ⅓ of the available fluid flow at all times. Of course this principle can be applied to more complex flow splitting ratios, as well as to larger systems having more components, channels, branches, control openings and relief openings.

In some embodiments, relief opening 222 may allow gas to flow both into and out of first channel 214. For example, relief opening may comprise a simple hole or tunnel through a wall of first channel 214. During rotation of fluid distribution system 200, centrifugal forces may drive the liquid column 252 radially outward such that it does not leak out of relief opening 222. However, in some situations, liquid may escape from relief opening 222. For example, when rotation is halted, the liquid may fall back through first channel 214 and escape out of relief opening 222. Alternatively, if liquid column 252 builds up during rotation to the point that it reaches relief opening 222, liquid may escape. However, in some embodiments this may be acceptable or even desirable, such as when the relief opening is designed to lead into another area in which fluid is delivered anyway. For example, in an electric propulsion system, oil that leaks through relief opening may simply drain to a sump (such as sump 325 in FIG. 3) or other area in which oil is delivered anyway. This arrangement may be desirable as it may prevent overflow from reaching back to first control opening 201 and creating a backpressure that may disturb the flow splitting ratio between first control opening 201 and fourth control opening 205.

It will be appreciated that although fluid distribution system 200 illustrates fluid distribution to three exemplary components, the disclosed embodiments are not limited to the number of components illustrated in FIG. 2. The disclosed embodiments may distribute oil to 1, 2, 3, 4, 5 or any number of components and may include 1, 2, 3, 4, 5 or more channels and/or branches, and any number of control openings. Furthermore, although embodiments of the present disclosure were illustrated with respect to a first channel 214 that splits into first and second branches 218, 220, embodiments of the present disclosure are not necessarily limited to this. For example, even in a simple case that omits second branch 220, third control opening 203, and second component 210, the use of first control opening 201 and relief opening 222 may still be advantageous to achieve a consistent flow splitting ratio between first component 208 and third component 212. In general, the number of components that fluid distribution system 200 supplies fluid to may depend on the configuration and needs of the rotating machine in which it is used, and any spatial constraints thereof. In general, fluid distribution system 200 can include additional control openings, relief openings, channels or branches as appropriate. Further, in some embodiments, not all control openings may be configured as passive control openings having fixed opening sizes. For example, in some embodiments, the size of one or more control openings may be actively modulated to achieve a desired flow split or other fluid distribution characteristics. For example, in some embodiments one or more control openings may comprise valves or other adjustable openings. In some embodiments, opening sizes may be adjusted by constricting a portion of a channel, such as by an external actuator. In some embodiments, a series of control openings may be provided which each have binary settings between restricted and fully open. By arranging a plurality of binary control openings in a channel having a variety of opening sizes, it may be possible to selectively adjust the flow splitting. Alternatively or additionally, control openings may be configured such that their radial distances from rotation axis 206 are adjustable. In this way, it may be possible to adjust a liquid pressure head according to eqn. 1 by changing the value of r. As described herein, the relative sizes (e.g., magnitudes) of first radial distance R1, second radial distance R2, and third radial distance R3 are exemplary. For example, a ratio R1/R2 may comprise any value less than one. Further, while R3 is described as being located between R1 and R2, embodiments of the present disclosure are not limited to this. For example, it may be possible that a first channel comprises a curved path having a segment that extends outward of second radial distance R2 or inward of first radial distance R1, and the relief opening 222 may be located in such a segment. In general, though, the relief opening may located downstream of the first control opening 201 in a fluid flow direction of the first channel 214 and upstream of the second control opening 202 in the fluid flow direction of the first channel 214.

Figure 3:
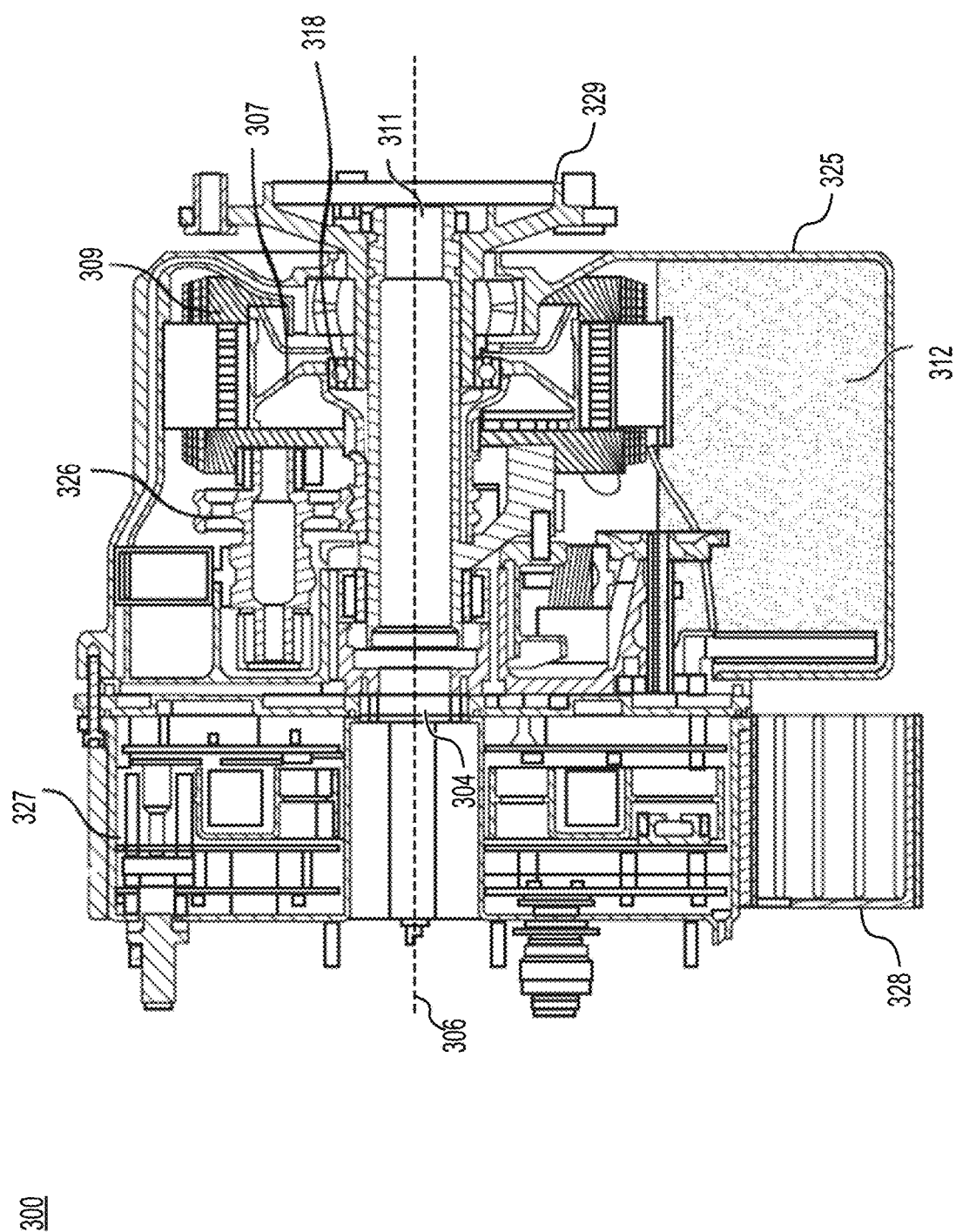
FIG. 3 is a partial cross-sectional view illustration of an exemplary engine, consistent with disclosed embodiments.

FIG. 3 illustrates an exemplary embodiment of an electric propulsion system 300, consistent with embodiments of the present disclosure. Electric propulsion system 300 may comprise an electric engine as shown in FIG. 3 and may include, e.g., a propeller (not shown) coupled to a flange 329. For example, electric propulsion system 300 may comprise an engine for a VTOL aircraft (such as, e.g., VTOL aircraft 500 of FIGS. 5A and 5B). Electric propulsion system 300 may comprise: a fluid chamber 304; an axis of rotation 306; a rotor 307; a stator 309; a shaft 311; a fluid (such as oil) 312, a bearing 318; a sump 325; a gearbox 326; an inverter 327; a heat exchanger 328; and flange 329.

Fluid chamber 304 may comprise any space, compartment, or plenum which can include fluid or distribute fluid, such as fluid 312. In some embodiments, fluid chamber 304 may be pressurized. For example, a fluid chamber may be disposed in a pressurized engine, or the interior of the fluid chamber may be pressurized (e.g., to an ambient pressure or atmospheric pressure). In some embodiments, fluid chamber 304 may be rotatable. For example, fluid chamber 304 may comprise a part of, or be coupled to, shaft 311. In some embodiments, shaft 311 may be coupled to a rotor 307, which may be indirectly or directly coupled to fluid chamber 304. For example, rotor 307 and shaft 311 may be coupled through direct contact or other means of attachment, such as fasteners. In another example, rotor 307 may be indirectly coupled to shaft 311 via a gear reduction, such as gearbox 326. In some embodiments, rotor 307 and stator 309 may drive rotations of shaft 311. In some embodiments, electric propulsion system 300 may provide lubrication and/or cooling to various components. For example, fluid 312, which may be oil, may be distributed throughout the electric propulsion system. In some embodiments, fluid may be located along the shaft 311, and rotations of shaft 311 may drive fluid via centrifugal force to various components of the electric propulsion system. For example, centrifugal force may drive fluid to provide cooling to components, such as magnets of rotor 307, windings of stator 309, or to electrical components of inverter 327. Additionally, or alternatively, centrifugal force may drive fluid to provide lubrication to components in electric propulsion system 300, such as bearing 318 or gearbox 326. For example, gearbox 326 may include one or more bearings and gears, and fluid 312 may be provided to the bearings and gears of gearbox 326 for lubrication. In some examples, gearbox 326 may correspond to a planetary gear reduction, and gearbox 326 may include sun gears and planetary gears. In some embodiments, fluid 312 may drain to a sump 325 after it has been distributed to one or more components. The fluid 312 may then be pumped or otherwise returned from the sump 325 to fluid chamber 304 to continue a fluid distribution cycle. In some embodiments the fluid 312 may be cycled through heat exchanger 328 to remove heat that was absorbed from the various components before returning it to fluid chamber 304. It will be recognized that the various components as described herein may be located at different radial positions with respect to a rotating axis such as shaft 311. As such, it will be appreciated that electric propulsion system 300 may include a fluid distribution system to assist in distributing fluid to the various components described herein. For example, although not illustrated in FIG. 3, electric propulsion system 300 may further comprise various control openings, channels, relief openings, etc. as discussed with respect to FIG. 2 above. An example of this is discussed with respect to FIG. 4 below.

Figure 4:
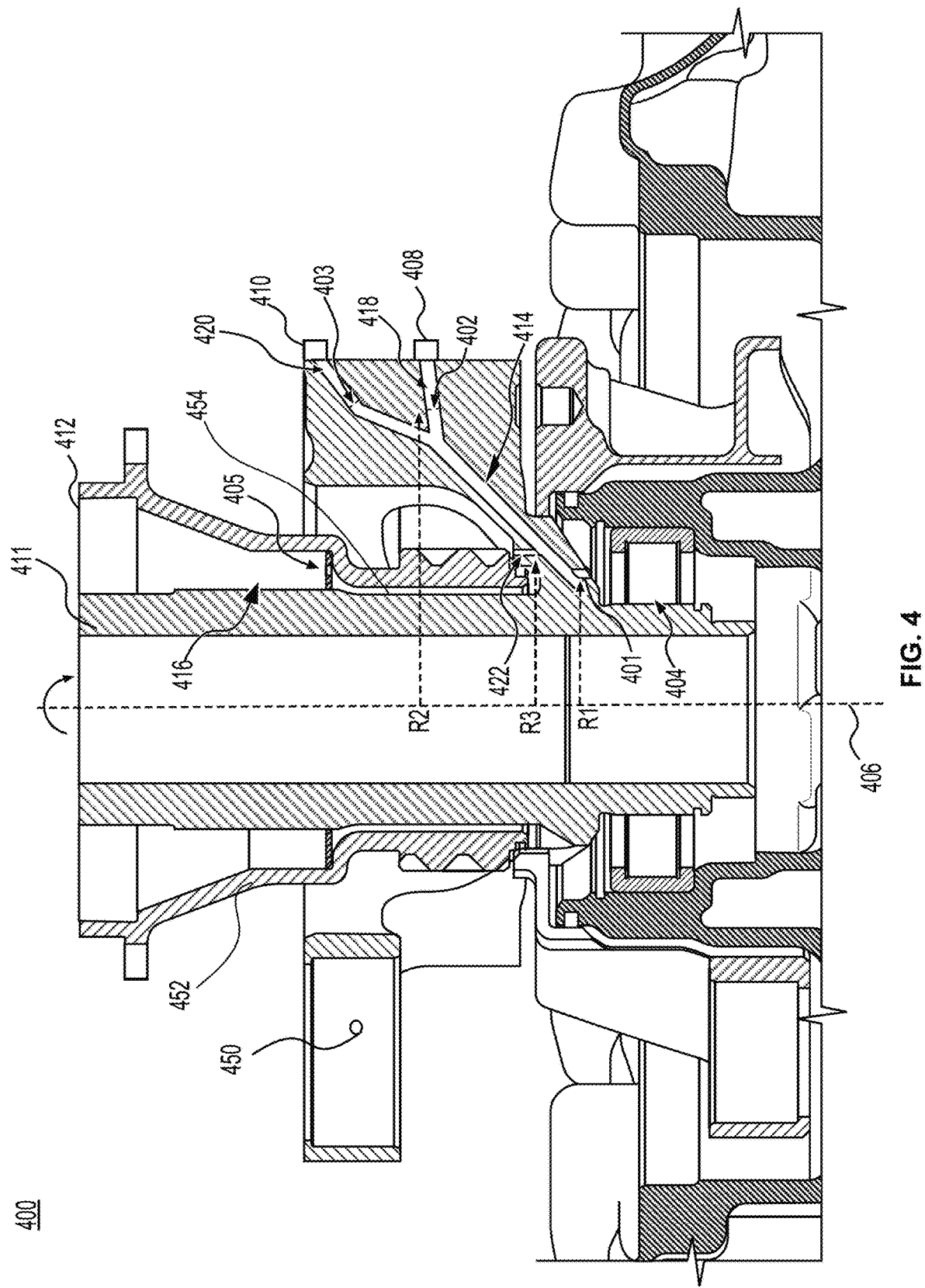
FIG. 4 is a cross-sectional view of an exemplary engine, consistent with disclosed embodiments.

FIG. 4 illustrates a view of electric propulsion system 400, consistent with embodiments of the present disclosure. In some embodiments, electric propulsion system 400 may correspond to electric propulsion system 300 of FIG. 3. In some embodiments, electric propulsion system 400 may comprise a fluid distribution system similar to fluid distribution system 200 of FIG. 2. Electric propulsion system 400 may comprise: a first control opening 401; a second control opening 402; a third control opening 403; a fluid chamber 404; a fourth control opening 405; an axis of rotation 406; a first component 408; a second component 410; a shaft 411 having an exterior 454; a third component 412; a first channel 414; a second channel 416; a first branch 418; a second branch 420; and a relief opening 422; a bearing 450; and a sun gear 452.

In some embodiments, shaft 411 may be coupled to rotor, such as rotor 307 as described with respect to FIG. 3. In some embodiments, fluids such as oil may be distributed from fluid chamber 404 along an exterior 454 of shaft 411. For example, in some embodiments a part of chamber 404 may be formed by the space between exterior 454 of shaft 411 and sun gear 452 of a gear reduction corresponding to gearbox 326 as described with respect to FIG. 3. Rotations of shaft 411 may exert centrifugal forces on fluid and distribute the fluid along exterior 454 and into various channels, such as first channel 414. For example, fluid may be fed from the fluid chamber to first control opening 401 at a first radial distance R1 from axis 406 to enter first channel 414. First channel 414 may include relief opening 422 at a third radial distance R3 from axis 406. For example, relief opening 422 may expose first channel 414 to an ambient pressure of electric propulsion system 400. The ambient pressure may refer to a local pressure of electric propulsion system 400 or an atmospheric pressure. First channel 414 may distribute fluid to downstream components, such as a first component 408 fed by second control opening 402 and a second component 410 fed by third control opening 403. For example, second and third control openings 402 or 403 may deliver oil in the form of an aerosol to the first or second components, respectively. In some examples, third control opening 403 may deliver oil to components such as bearing 450. In some embodiments, fourth control opening 405 may be located at the same radial distance R1 from axis 406 as first control opening 401. Fourth control opening 405 may distribute fluids such as oil along second channel 416 to a third component 412, which may comprise components of the electric propulsion system such as rotor 307 or stator 309 of FIG. 3. It will be appreciated that descriptions of components fed by a fluid distribution system are not limited to the exemplary components illustrated herein. For example, components may refer to any component of an electric propulsion system which may benefit from lubrication and/or cooling, including bearings, gearbox components (e.g., gears, bearings, shafts), rotor components (e.g., rotor magnets), or stator components (e.g., stator windings). As such, it will be appreciated that the disclosed embodiments enable the flow to be split among two or more components, through two or more control openings, in relative proportions that remain constant with a change in rotational speed. The relative proportion of flow split may refer to the fraction of total flow that is allocated to each control opening as compared to the others. While the total flow rate in a fluid distribution system may change as a function of RPM due to increased centrifugal forces from a fluid chamber, the proportional flow split among control openings may remain unchanged in view of the arrangements described herein. For example, it may be desired to maintain a certain amount of fluid to various components, such as maintaining the amount of fluid received by one component relative to how much another component receives. For example, the amount of fluid in the fluid distribution system may be represented as $S1+S2+S3=1$, where S1, S2, and S3 represent the proportional split or fractional amount of fluid to a first component, second component, and third component, respectively, and the number 1 represents the total amount of fluid flowing at a given time. Further, a relative proportion of flow split may describe a subset of all fluid flows. For example, if S2 represents the amount of fluid allocated to second control opening 202 in FIG. 2, and S3 represents the amount of fluid allocated to third control opening 203 in FIG. 2, then S2:S3 may describe a relative proportion as the ratio of fluid passing through each of the second and third control openings. Because these openings are located at the same radial distance R2 from axis of rotation 206, the relative proportion S2:S3 will remain constant even when actual amount of fluid flow changes due to a change in RPM.

Figure 5A:
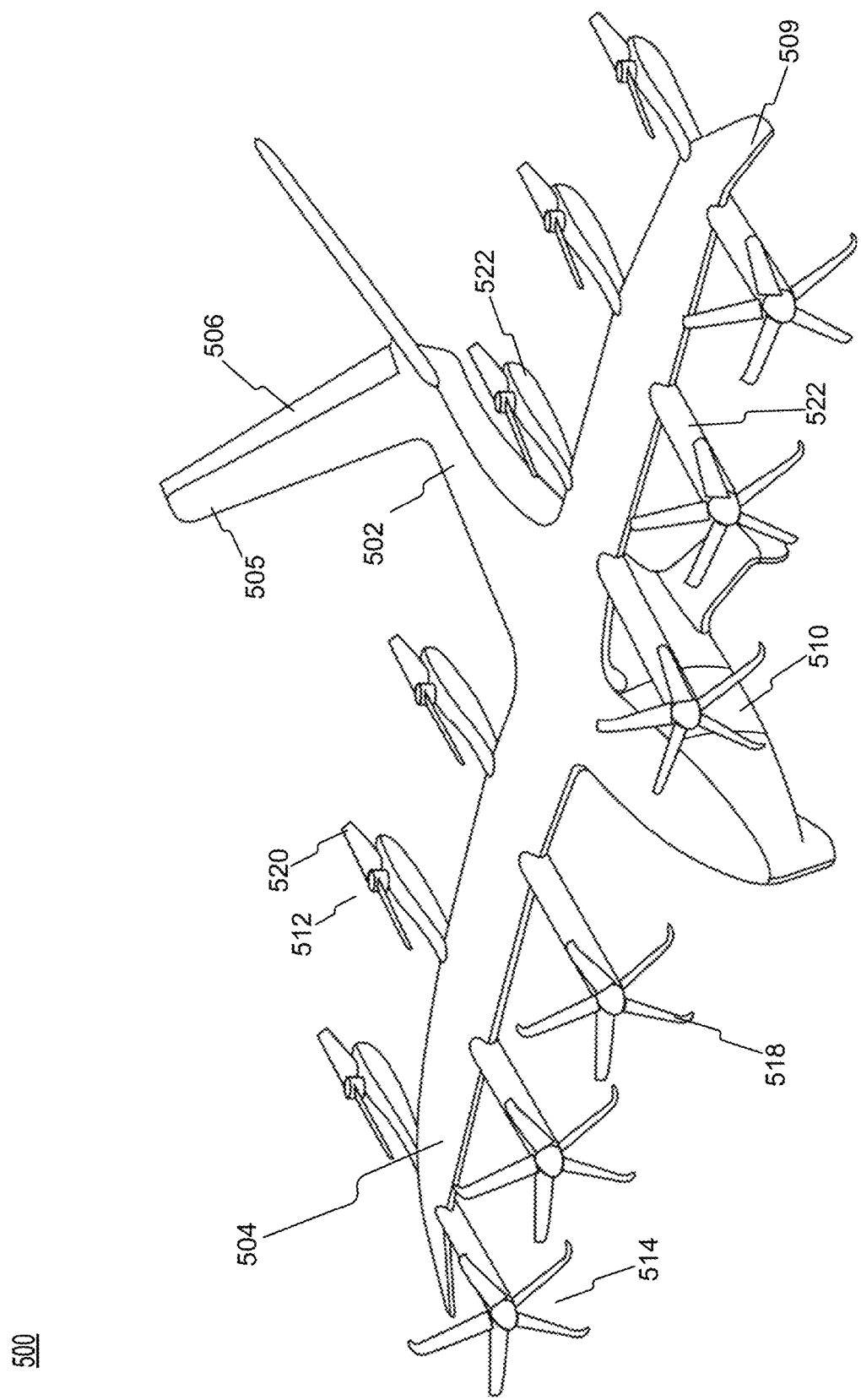
FIGS. 5A and 5B are illustrations of a perspective view of an exemplary VTOL aircraft, consistent with disclosed embodiments.
Figure 5B:
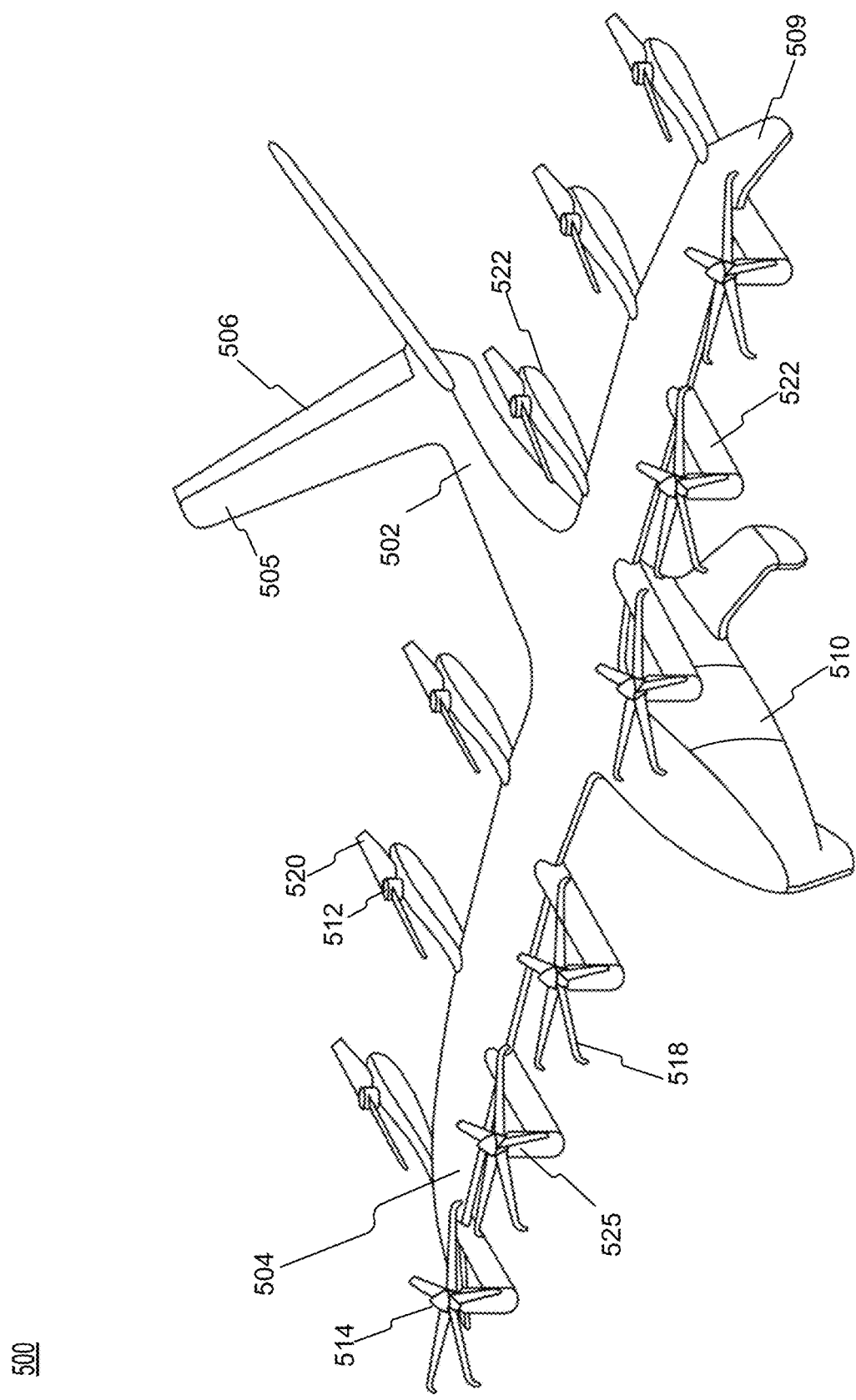

FIGS. 5A and 5B illustrate a VTOL aircraft 500 in a cruise configuration and a vertical take-off, landing and hover configuration (also referred to herein as a "lift" configuration), respectively, consistent with embodiments of the present disclosure. Aircraft 500 represents an example of an apparatus that may utilize fluid distribution systems as discussed above with respect to FIGS. 2-4. The aircraft 500 may include a fuselage 502, wings 504 mounted to the fuselage 502, tail 505, and one or more rear stabilizers 506 mounted to the tail 505 or the rear of the fuselage 502. A plurality of lift propellers 512 may be mounted to wings 504 and configured to provide lift for vertical take-off, landing and hover. A plurality of tilt propellers 514 may be mounted to wings 504 and may be tiltable between the cruise configuration in which they provide forward thrust to aircraft 500 for horizontal flight, as shown in FIG. 5A, and the lift configuration in which they provide a portion of the lift required for vertical take-off, landing and hovering, as shown in FIG. 5B. As used herein, a lift configuration may refer to a tilt propeller orientation in which the tilt propeller thrust is providing primarily lift to the aircraft. A cruise configuration may refer to a tilt propeller orientation in which the tilt propeller thrust is providing primarily forward thrust to the aircraft. Alternatively, a cruise configuration may refer to a configuration in which a lift propeller is stowed.

In some embodiments, lift propellers 512 may be configured for providing lift only, with all propulsion being provided by the tilt propellers. Accordingly, lift propellers 512 may be in fixed positions and may only generate thrust during take-off, landing and hover. Meanwhile, tilt propellers 514 may be tilted to lift configurations in which their thrust is directed vertically for providing additional lift.

For forward flight, tilt propellers 514 may tilt from their lift configurations to their cruise configurations. In other words, the pitch and tilt angle of tilt propellers 514 may be varied from an orientation in which the tilt propeller thrust is directed vertically (to provide lift during vertical take-off, landing and hover) to an orientation in which the tilt propeller thrust is directed horizontally (to provide forward thrust to aircraft 500). The tilt propellers may tilt about axes that may be perpendicular to the forward direction of the aircraft 500. When the aircraft 500 is in full forward flight during the cruise configuration, lift may be provided entirely by wings 504. Meanwhile, lift propellers 512 may be shut off. The blades 520 of lift propellers 512 may be locked in low-drag positions for aircraft cruising. In some embodiments, lift propellers 512 may each have two blades 520 that may be locked for cruising in minimum drag positions in which one blade is directly in front of the other blade as illustrated in FIG. 5A. In some embodiments, lift propellers 512 have more than two blades. In some embodiments, there may be more blades 518 on tilt propellers 514 than on lift propellers 512. For example, as illustrated in FIGS. 5A and 5B, lift propellers 512 may each include, e.g., two blades and tilt propellers 514 may each include, e.g., five blades. In some embodiments, tilt propellers 514 may have, e.g., from 2 to 5 blades.

In some embodiments, the aircraft may include only one wing 504 on each side of fuselage 502 (or a single wing that extends across the entire aircraft) and at least a portion of lift propellers 512 may be located rearward of wings 504 and at least a portion of tilt propellers 514 may be located forward of wings 504. In some embodiments, all of lift propellers 512 may be located rearward of wings 504 and all of tilt propellers 514 may be located forward of wings 504. According to some embodiments, all lift propellers 512 and tilt propellers 514 may be mounted to the wings—i.e., no lift propellers or tilt propellers may be mounted to the fuselage. In some embodiments, lift propellers 512 may be all located rearwardly of wings 504 and tilt propellers 514 may be all located forward of wings 504. According to some embodiments, all lift propellers 512 and tilt propellers 514 may be positioned inwardly of the wing tips 509.

In some embodiments, lift propellers 512 and tilt propellers 514 may be mounted to wings 504 by booms 522. Booms 522 may be mounted beneath wings 504, on top of the wings, and/or may be integrated into the wing profile. In some embodiments, one lift propeller 512 and one tilt propeller 514 may be mounted to each boom 522. Lift propeller 512 may be mounted at a rear end of boom 522 and tilt propeller 514 may be mounted at a front end of boom 522. In some embodiments, lift propeller 512 may be mounted in a fixed position on boom 522. In some embodiments, tilt propeller 514 may mounted to a front end of boom 522 via a hinge. Tilt propeller 514 may be mounted to boom 522 such that tilt propeller 514 is aligned with the body of boom 522 when in the cruise configuration, forming a continuous extension of the front end of boom 522 that minimizes drag for forward flight.

In some embodiments, aircraft 500 may include, e.g., one wing on each side of fuselage 502 or a single wing that extends across the aircraft. According to some embodiments, the at least one wing 504 is a high wing mounted to an upper side of fuselage 502. According to some embodiments, the wings include control surfaces, such as flaps, ailerons or flaperons. According to some embodiments, the wings may have curved wing tips 509 for reduced drag during forward flight.

In some embodiments, rear stabilizers 506 include control surfaces, such as one or more rudders, one or more elevators, and/or one or more combined rudder-elevators. The wing(s) may have any suitable design. For example, the wings have a tapering leading edge or a tapering trailing edge. In some embodiments, the wings may have a substantially straight leading edge in the central section of wings 504.

Aircraft 500 may include at least one door 510 for passenger entry and exit. In some embodiments, the door 510 may be located beneath and forward of wings 504 as seen in FIGS. 5A and 5B.

In some embodiments, oil may be used as a lubricant throughout an electric engine and may also be used as coolant fluid to assist in managing the heat generated by the engine during operation. For example, oil may be used to cool and/or lubricate components of electric engines in aircraft 500. Further to this example, different amounts of oil may be used to act as both lubricant and coolant fluid in the electric engine, such as less than or equal to one quart, 5.5 quarts, two quarts, 2.5 quarts, three quarts, five quarts or any other amount of oil needed to lubricate and cool the electric engine, in combination with or without the assistance of air cooling. In some embodiments, the amount of the oil or liquid to be used in the system in relation to cooling may be determined based on an amount of thermal mass needed to drive heat transfer from the components of the electric propulsion system. As has been disclosed herein, an electric engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than the engine only used in one orientation. As such, all the engines on an aircraft may not include the same amount of lubricant and coolant. For example, a lifting and landing engine may only require less than one quart of oil while an engine that operates in all stages of flight may require more than one quart of oil. In some embodiments, the amount of oil or liquid for cooling may be of an appropriate amount to provide sufficient thermal mass to drive heat transfer from the components of the electric propulsion system no matter the orientation of the electric propulsion system. The embodiments discussed herein are exemplary, non-limiting, and do not dictate the bounds of the amount of lubricant and coolant that may be used in an electric engine.

Some embodiments may use oil to lubricate the electric engine and to cool the electric engine. Such embodiments may require additional volumes of oil compared to embodiments using oil exclusively for cooling or exclusively for lubrication. In such embodiments, the additional oil may allow for removal of traditional components that may be used to cool such an electric engine. For example, if the electric engine were cooled by another liquid such as glycol, the engine may comprise separate heat exchangers for both the lubricant fluid and the coolant fluid. As such, in embodiments where a single fluid is being used for both lubrication and cooling, such as oil, an increase in oil would be present but there would only be a need for one heat exchanger, so there may be a decrease in mass, due to using a smaller number of heat exchangers and potentially other components not being required, of the overall system and an improved drag profile may be present. Further, using one substance, such as oil, for the lubrication and cooling of the engine may increase efficiency of the system due to the reduction in mass (e.g., due to redundancies) and the benefits of cooling the engine with a substance such as oil rather than relying on air cooling which may have issues traveling throughout the engine. As such, it may be desired to distribute the one substance (e.g., oil) throughout the engine to provide lubrication for components, such as bearings or gears, while also providing cooling for components, such as magnets or windings of a motor.

In some embodiments, one or more electric propulsion systems of one or more propellers 512 or 514 may comprise fluid distribution systems as described above. Such fluid distribution systems may provide a passive system for ensuring that no components are starved of oil or other fluid due to an unwanted imbalance in flow distribution, regardless of the RPM of the electric propulsion systems.

Figure 6:
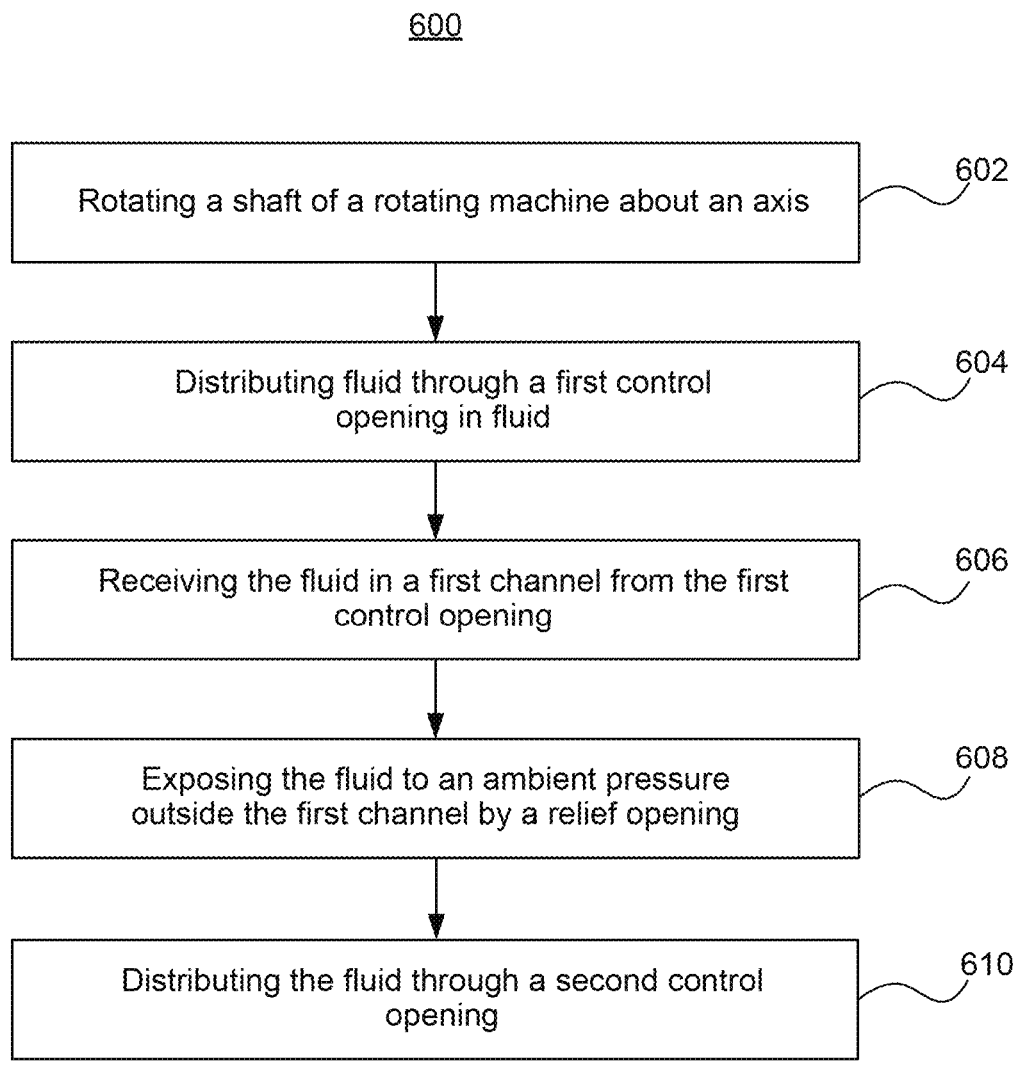
FIG. 6 is a flow diagram of an exemplary process of distributing fluid, consistent with disclosed embodiments.

FIG. 6 illustrates a flow diagram of a method 600 for distributing fluid in a rotating machine, consistent with embodiments of the present disclosure. Method 600 may be performed using, e.g., fluid distribution system 200 of FIG. 2, electric propulsion systems 300 or 400 of FIG. 3 or 4, VTOL aircraft 500 of FIGS. 5A and 5B, or other rotating machines as described herein.

In some embodiments, method 600 may include a step 602 of rotating a shaft of a rotating machine about an axis. The shaft may be coupled to a fluid chamber to rotate the fluid chamber about the axis.

In some embodiments, method 600 may include a step 604 of distributing the fluid through a first control opening. The first control opening may be in fluid communication with the fluid chamber by centrifugal force from rotation of the fluid chamber or the shaft. The first control opening may be located at a first radial distance from an axis. In some examples, the fluid may be fed from the fluid chamber to the first control opening along an exterior of the shaft.

In some embodiments, method 600 may include a step 606 of receiving the fluid in a first channel from the first control opening. The first channel may include a first branch and a second branch.

In some embodiments, method 600 may include a step 608 of exposing the fluid to an ambient pressure outside the first channel by a relief opening in the first channel. The relief opening may be located downstream of the first control opening in a fluid flow direction of the first channel.

In some embodiments, method 600 may include a step 610 of distributing the fluid through a second control opening in the first channel. The second control opening may be located at a second radial distance from the axis. For example, the second radial distance may be greater than the first radial distance. In some embodiments, the relief opening may be located upstream of the second control opening in the fluid flow direction of the first channel. Step 610 may include delivering the fluid to a component of the rotating machine through the second control opening. The second control opening may be located in the first branch, and the second branch may include a third control opening located at the second radial distance. Step 610 may further involve building a fluid pressure head in the first channel at the second control opening. In some embodiments, step 610 may involve distributing fluid through the second control opening and the third control opening by a first relative proportion that remains constant with a change in rotational speed of the rotor.

In some embodiments, method 600 may involve distributing fluid through the first control opening and a fourth control opening by a second relative proportion that may remain constant with a change in rotational speed of the rotor. The fourth control opening may be in fluid communication with the fluid chamber. The fourth control opening may be located at the first radial distance.

Embodiments of the present disclosure may be described using the following clauses:

1. A fluid distribution system comprising:
   a fluid chamber in a rotating machine;
   a first control opening component in fluid communication with the fluid chamber, the first control opening component being located at a first radial distance from an axis;
   a rotating shaft coupled to the fluid chamber and configured to rotate the fluid chamber about the axis to cause the fluid chamber to distribute fluid through the first control opening component;
   a first channel coupled to the first control opening component and configured to receive the fluid through the first control opening component;
   a second control opening component in the first channel, the second control opening component being located at a second radial distance from the axis, the second radial distance being greater than the first radial distance; and a relief opening in the first channel, the relief opening being configured to expose the first channel to an ambient pressure outside the first channel, wherein the relief opening is located downstream of the first control opening component in a fluid flow direction of the first channel and upstream of the second control opening component in the fluid flow direction of the first channel.

2. The fluid distribution system of clause 1, wherein the second control opening component is configured to build a liquid pressure head in the first channel by restricting liquid flow in the first channel.

3. The fluid distribution system of clause 1 or 2, further comprising:
   a first branch of the first channel located downstream of the first control opening component in a fluid flow direction of the first channel, the second control opening component being located in the first branch; and
   a second branch of the first channel located downstream of the first control opening component in a fluid flow direction of the first channel; and a third control opening component located in the second branch.

4. The fluid distribution system of clause 3, wherein the third control opening component is located at the second radial distance from the axis.

5. The fluid distribution system of clause 3 or 4, further configured to divide fluid flowing through the second control opening component and the third control opening component according to a first relative proportion of fluid flow through the second control opening component and the third control opening component, wherein the first relative proportion remains constant with a change in rotational speed of the fluid chamber.

6. The fluid distribution system of any of clauses 1 to 5, further comprising a fourth control opening component in fluid communication with the fluid chamber, the fourth control opening component being located at the first radial distance from the axis.

7. The fluid distribution system of clause 6, further configured to divide fluid flowing through the first control opening component and the fourth control opening component according to a second relative proportion of fluid flow through the first control opening component and the fourth control opening component, wherein the second relative proportion remains constant with a change in rotational speed of the fluid chamber.

8. The fluid distribution system of any of clauses 1 to 7, wherein the second control opening component is configured to allow delivery of fluid to a component of the rotating machine.

9. The fluid distribution system of clause 8, wherein the component of the rotating machine comprises at least one of a bearing, a stator, or a winding.

10. The fluid distribution system of any of clauses 1 to 9, further comprising:
    a rotor coupled to the rotating shaft, wherein the fluid is fed from the fluid chamber to the first opening control opening component along an exterior of the shaft.

11. The fluid distribution system of any of clauses 1 to 10, wherein the fluid comprises at least one of a coolant or lubricant.

12. The fluid distribution system of any of clauses 1 to 11, wherein the rotating machine includes one of an engine, a motor, a transmission, a generator, a turbine, or a compressor.

13. The fluid distribution system of clause 12, wherein the rotating machine includes an engine of a propulsion system for a vertical takeoff and landing (VTOL) aircraft.

14. A method of distributing fluid in a rotating machine, comprising:
    rotating a shaft of the rotating machine about an axis, the shaft being coupled to a fluid chamber to rotate the fluid chamber about the axis;
    distributing the fluid through a first control opening component in fluid communication with the fluid chamber by centrifugal force from rotation of the fluid chamber, the first control opening component being located at a first radial distance from the axis;
    receiving the fluid in a first channel from the first control opening component;
    exposing the fluid to an ambient pressure outside the first channel through a relief opening in the first channel, wherein the relief opening is located downstream of the first control opening component in a fluid flow direction of the first channel; and
    distributing the fluid through a second control opening component in the first channel, the second control opening component being located at a second radial distance from the axis, the second radial distance being greater than the first radial distance,
    wherein the relief opening is located upstream of the second control opening component in the fluid flow direction of the first channel.

15. The method of clause 14, further comprising building a liquid pressure head in the first channel by restricting liquid flow in the second channel by the second control opening component.

16. The method of clause 14 or 15, wherein:
    the first channel comprises a first branch and a second branch, the first branch and the second branch being located downstream of the first control opening component in a fluid flow direction of the first channel; wherein
    the second control opening component is located in the first branch and a third control opening component is located in the second branch at the second radial distance from the axis,
    wherein fluid flowing through the second control opening component and the third control opening component is divided according to a first relative proportion of fluid flow through the second control opening component and the third control opening component, wherein the first relative proportion remains constant with a change in rotational speed of the shaft.

17. The method of any of clauses 14 to 16, further comprising a fourth control opening component in fluid communication with the fluid chamber, the fourth control opening component being located at the first radial distance from the axis,
    wherein fluid flowing through the first control opening component and the fourth control opening component is divided according to a second relative proportion of fluid flow through the first control opening component and the fourth control opening component, wherein the second relative proportion remains constant with a change in rotational speed of the shaft.

18. The method of any of clauses 14 to 17, further comprising delivering fluid to a component of the rotating machine through the second control opening component.

19. The method of clause 18, wherein the component of the rotating machine comprises at least one of a bearing, a stator, or a winding.

20. The method of any of clauses 14 to 19, wherein the rotating machine includes a rotor coupled to the rotating shaft, and the fluid is fed from the fluid chamber to the first opening control opening component along an exterior of the shaft.

21. A system comprising:
   a rotating machine, wherein the rotating machine comprises one of an engine, motor, transmission, generator, turbine, or compressor;
   a fluid chamber in the rotating machine;
   a first control opening component in fluid communication with the fluid chamber, the first control opening component being located at a first radial distance from an axis;
   a rotating shaft coupled to the fluid chamber and configured to rotate the fluid chamber about the axis to cause the fluid chamber to distribute fluid through the first control opening component;
   a first channel coupled to the first control opening component and configured to receive the fluid through the first control opening component;
   a second control opening component in the first channel, the second control opening component being located at a second radial distance from the axis, the second radial distance being greater than the first radial distance; and
   a relief opening in the first channel, the relief opening being configured to expose the first channel to an ambient pressure outside the first channel, wherein the relief opening is located downstream of the first control opening component in a fluid flow direction of the first channel and upstream of the second control opening component in the fluid flow direction of the first channel.

22. The system of clause 21, wherein the second control opening component is configured to build a liquid pressure head in the first channel by restricting liquid flow in the first channel.

23. The system of clause 21 or 22, further comprising:
   a first branch of the first channel located downstream of the first control opening component in a fluid flow direction of the first channel, the second control opening component being located in the first branch;
   a second branch of the first channel located downstream of the first control opening component in a fluid flow direction of the first channel; and
   a third control opening component located in the second branch.

24. The system of clause 23, wherein the third control opening component is located at the second radial distance from the axis.

25. The system of clause 23 or 24, wherein system is configured to divide fluid flowing through the second control opening component and the third control opening component according to a first relative proportion of fluid flow through the second control opening component and the third control opening component, wherein the first relative proportion remains constant with a change in rotational speed of the shaft.

26. The system of any of clauses 21 to 25, further comprising a fourth control opening component in fluid communication with the fluid chamber, the fourth control opening component being located at the first radial distance from the axis.

27. The system of clause 26, further configured to divide fluid flowing through the first control opening component and the fourth control opening component according to a second relative proportion of fluid flow through the first control opening component and the fourth control opening component, wherein the second relative proportion remains constant with a change in rotational speed of the shaft.

28. The system of any of clauses 21 to 28, wherein the rotating machine comprises an engine of a vertical takeoff and landing (VTOL) aircraft.

The embodiments disclosed herein are intended to be non-limiting. Those of ordinary skill in the art will appreciate that certain components and configurations of components may be modified without departing from the scope of the disclosed embodiments. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A fluid distribution system comprising:
   a fluid chamber in a rotating machine;
   a first control opening component in fluid communication with the fluid chamber, the first control opening component being located at a first radial distance from an axis;
   a rotating shaft coupled to the fluid chamber and configured to rotate the fluid chamber about the axis to cause the fluid chamber to distribute fluid through the first control opening component;
   a first channel coupled to the first control opening component and configured to receive the fluid through the first control opening component;
   a second control opening component in the first channel, the second control opening component being located at a second radial distance from the axis, the second radial distance being greater than the first radial distance; and
   a relief opening in the first channel, the relief opening being configured to expose the first channel to an ambient pressure outside the first channel, wherein the relief opening is located downstream of the first control opening component in a fluid flow direction of the first channel and upstream of the second control opening component in the fluid flow direction of the first channel.

2. The fluid distribution system of claim 1, wherein the second control opening component is configured to build a liquid pressure head in the first channel by restricting liquid flow in the first channel.

3. The fluid distribution system of claim 1, further comprising:
   a first branch of the first channel located downstream of the first control opening component in a fluid flow direction of the first channel, the second control opening component being located in the first branch; and
   a second branch of the first channel located downstream of the first control opening component in a fluid flow direction of the first channel; and a third control opening component located in the second branch.

4. The fluid distribution system of claim 3, wherein the third control opening component is located at the second radial distance from the axis.

5. The fluid distribution system of claim 3, further configured to divide fluid flowing through the second control opening component and the third control opening component according to a first relative proportion of fluid flow through the second control opening component and the third control opening component, wherein the first relative proportion remains constant with a change in rotational speed of the fluid chamber.

6. The fluid distribution system of claim 1, further comprising a fourth control opening component in fluid communication with the fluid chamber, the fourth control opening component being located at the first radial distance from the axis.

7. The fluid distribution system of claim 6, further configured to divide fluid flowing through the first control opening component and the fourth control opening component according to a second relative proportion of fluid flow through the first control opening component and the fourth control opening component, wherein the second relative proportion remains constant with a change in rotational speed of the fluid chamber.

8. The fluid distribution system of claim 1, wherein the second control opening component is configured to allow delivery of fluid to a component of the rotating machine.

9. The fluid distribution system of claim 8, wherein the component of the rotating machine comprises at least one of a bearing, a stator, or a winding.

10. The fluid distribution system of claim 1, further comprising:
a rotor coupled to the rotating shaft, wherein the fluid is fed from the fluid chamber to the first opening control opening component along an exterior of the shaft.

11. The fluid distribution system of claim 1, wherein the fluid comprises at least one of a coolant or lubricant.

12. The fluid distribution system of claim 1, wherein the rotating machine includes one of an engine, a motor, a transmission, a generator, a turbine, or a compressor.

13. The fluid distribution system of claim 12, wherein the rotating machine includes an engine of a propulsion system for a vertical takeoff and landing (VTOL) aircraft.

14. A method of distributing fluid in a rotating machine, comprising:
rotating a shaft of the rotating machine about an axis, the shaft being coupled to a fluid chamber to rotate the fluid chamber about the axis;
distributing the fluid through a first control opening component in fluid communication with the fluid chamber by centrifugal force from rotation of the fluid chamber, the first control opening component being located at a first radial distance from the axis;
receiving the fluid in a first channel from the first control opening component;
exposing the fluid to an ambient pressure outside the first channel through a relief opening in the first channel, wherein the relief opening is located downstream of the first control opening component in a fluid flow direction of the first channel; and
distributing the fluid through a second control opening component in the first channel, the second control opening component being located at a second radial distance from the axis, the second radial distance being greater than the first radial distance,
wherein the relief opening is located upstream of the second control opening component in the fluid flow direction of the first channel.

15. The method of claim 14, further comprising building a liquid pressure head in the first channel by restricting liquid flow in the second channel by the second control opening component.

16. The method of claim 14, wherein:
the first channel comprises a first branch and a second branch, the first branch and the second branch being located downstream of the first control opening component in a fluid flow direction of the first channel; wherein
the second control opening component is located in the first branch and a third control opening component is located in the second branch at the second radial distance from the axis,
wherein fluid flowing through the second control opening component and the third control opening component is divided according to a first relative proportion of fluid flow through the second control opening component and the third control opening component, wherein the first relative proportion remains constant with a change in rotational speed of the shaft.

17. The method of claim 14, further comprising a fourth control opening component in fluid communication with the fluid chamber, the fourth control opening component being located at the first radial distance from the axis,
wherein fluid flowing through the first control opening component and the fourth control opening component is divided according to a second relative proportion of fluid flow through the first control opening component and the fourth control opening component, wherein the second relative proportion remains constant with a change in rotational speed of the shaft.

18. The method of claim 14, further comprising delivering fluid to a component of the rotating machine through the second control opening component.

19. The method of claim 18, wherein the component of the rotating machine comprises at least one of a bearing, a stator, or a winding.

20. The method of claim 14, wherein
the rotating machine includes a rotor coupled to the rotating shaft, and
the fluid is fed from the fluid chamber to the first opening control opening component along an exterior of the shaft.

21. A system comprising:
a rotating machine, wherein the rotating machine comprises one of an engine, motor, transmission, generator, turbine, or compressor;
a fluid chamber in the rotating machine;
a first control opening component in fluid communication with the fluid chamber, the first control opening component being located at a first radial distance from an axis;
a rotating shaft coupled to the fluid chamber and configured to rotate the fluid chamber about the axis to cause the fluid chamber to distribute fluid through the first control opening component;
a first channel coupled to the first control opening component and configured to receive the fluid through the first control opening component;
a second control opening component in the first channel, the second control opening component being located at a second radial distance from the axis, the second radial distance being greater than the first radial distance; and a relief opening in the first channel, the relief opening being configured to expose the first channel to an ambient pressure outside the first channel, wherein the relief opening is located downstream of the first control opening component in a fluid flow direction of the first channel and upstream of the second control opening component in the fluid flow direction of the first channel.

22. The system of claim 21, wherein the second control opening component is configured to build a liquid pressure head in the first channel by restricting liquid flow in the first channel.

23. The system of claim 21, further comprising:
a first branch of the first channel located downstream of the first control opening component in a fluid flow direction of the first channel, the second control opening component being located in the first branch;
a second branch of the first channel located downstream of the first control opening component in a fluid flow direction of the first channel; and
a third control opening component located in the second branch.

24. The system of claim 23, wherein the third control opening component is located at the second radial distance from the axis.

25. The system of claim 23, wherein system is configured to divide fluid flowing through the second control opening component and the third control opening component according to a first relative proportion of fluid flow through the second control opening component and the third control opening component, wherein the first relative proportion remains constant with a change in rotational speed of the shaft.

26. The system of claim 21, further comprising a fourth control opening component in fluid communication with the fluid chamber, the fourth control opening component being located at the first radial distance from the axis.

27. The system of claim 26, further configured to divide fluid flowing through the first control opening component and the fourth control opening component according to a second relative proportion of fluid flow through the first control opening component and the fourth control opening component, wherein the second relative proportion remains constant with a change in rotational speed of the shaft.

28. The system of claim 21, wherein the rotating machine comprises an engine of a vertical takeoff and landing (VTOL) aircraft.

* * * * *